CAPACITANCE OPERATED ELECTRONIC CONTROL

Filed Nov. 7, 1955 2 Sheets-Sheet 1

INVENTOR:
DONALD O. KOCMICH
BY Kent W. Wonnell
Atty.

INVENTOR:
DONALD O. KOCMICH
BY Kent W. Wonnell
Atty.

United States Patent Office 2,958,018
Patented Oct. 25, 1960

2,958,018

CAPACITANCE OPERATED ELECTRONIC CONTROL

Donald O. Kocmich, 3946 Ellington Ave., Western Springs, Ill.

Filed Nov. 7, 1955, Ser. No. 545,343

1 Claim. (Cl. 317—149)

This invention relates particularly to the design and construction of inductance media for coupling electronic components together and makes them subject to an external effect such as a change in capacitance. There are several different types of industrial controls; some are actuated by resistance and some by inductance and some by capacitance. The present invention falls in this latter group. A primary feature is in the design of an inductance used to connect an external pick-up element to the capacitance control elements.

Industrial requirements for many control applications require that an alarm be sounded, or that the equipment be turned off in a safe condition if a component thereof fails. The control instrument should be safe as possible for use in hazardous locations. This means that the external pick-up should be free from dangerous voltage and should be so arranged in a circuit that such voltage cannot accidentally appear on a probe or pick-up.

This invention relates specifically to a circuit having the necessary isolation features and a coupling inductance of specific design in said circuit. The resulting control has improved sensitivity without loss of stability.

An important object of the invention is to provide a coupling inductance that controls the effect of an external pick-up on an electronic tube which produces a control signal.

A further object of the invention is to provide an improvement in coupling inductances comprising a plurality of coils of predetermined diameter to width ratio which requires an external capacity value of predetermined adjustment to cause a change in the plate current of electronic tubes to actuate a relay in a circuit.

A further object of the invention is to provide two predetermined input capacity values which are required to complete the closing and opening of relay contacts.

A further object of the invention is to provide inductances in electronic circuits arranged and adjusted to require two predetermined input capacity values to occur in proper sequence and to remain in operated condition until a third capacity value is impressed on the input of said inductance to re-set it.

Still a further object of the invention is to provide a coaxial cable having a core of insulating material for supporting two or more conductors inside of a metal tubing in which the core is located.

A still further object of the invention is to provide a coaxial cable having a helically twisted supporting member of insulating material with conductors arranged on the supporting member to provide a constant impedance circuit with cables of different length.

A still further object of the invention is to provide a coaxial cable for use with a capacity operated relay having small unit per foot capacity supported by a helically twisted insulated core with a minimum of cross section affecting the di-electric relationship of the conductor to a metallic shield surrounding it.

Other objects of the invention will appear in the specification and will be apparent from the accompanying drawings in which.

Figure 1:
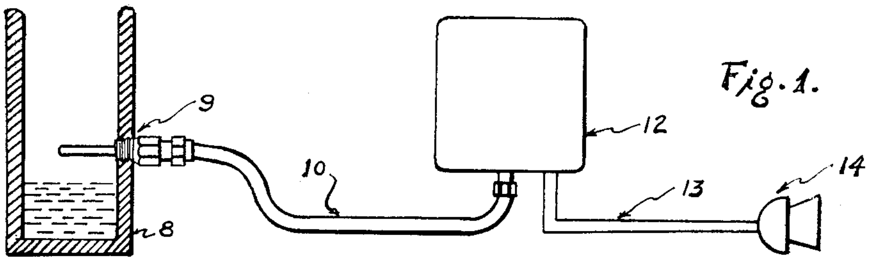
Fig. 1 represents a block installation diagram of an asembly in accordance with this invention, comprising a probe, a co-axial cable, a capacitance relay, and controlled alarm media.

In this invention, the inductances or a tube matching transformer having a primary and two or more secondary windings are so arranged that they produce a locking or overlapping effect as interpreted by the action of a plate current relay. This overlapping effect is controlled to a predetermined range and is determined by coil design. To illustrate the purpose and action of the invention, a small capacitance change at a probe 9 extending for example, within a receptacle 8 is transmitted to a circuit including a relay winding 25 by means of a coaxial cable 10 as shown in Fig. 1 leading to a control unit 12 having conductors 13 of any length for carrying the relay circuit to an actuated device 14.

The pick-up or probe may be any one of several shapes whose purpose is to convert the effect of a material acting upon the probe into an electrical change of capacitance. The signal or change received by the probe is very small and must be amplified to be useful and to perform the desired functions. Also the electrical change at the probe must be transmitted to the control unit 12 with accuracy and a special type of conductor called a co-axial cable is used.

Figures 2, 3, 4:
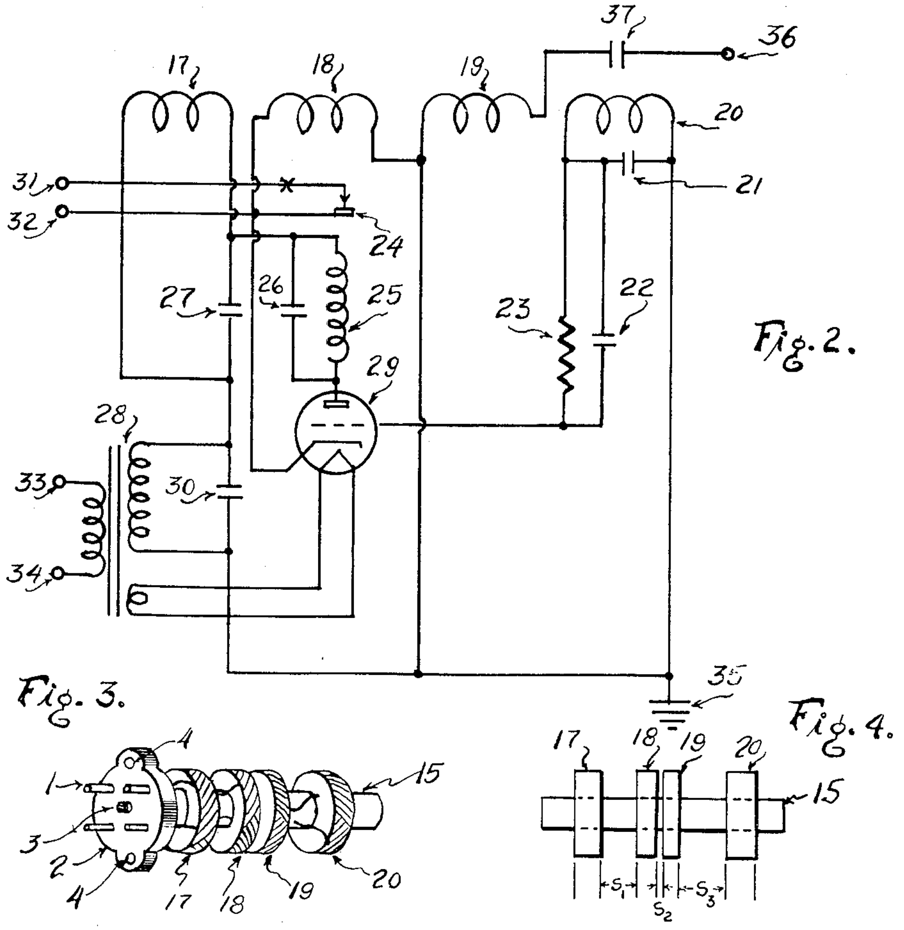
Fig. 2 is a wiring diagram showing the connection and electrical elements used in the capacitance relay of Fig. 1.
Fig. 3 is a perspective view of the coupling inductance.
Fig. 4 shows a diagrammatic arrangement of the inductance elements.

An ordinary co-axial cable is subject to changes electrically that affect the accuracy of the small capacitance control signal. This invention relates to a co-axial cable having improved stability and less capacity per unit length than cable of this kind available up to this time as hereafter set forth. The control unit 12 contains an electronic tube 29 and different components as shown in Fig. 2 as hereafter described and a main control relay 25. The function of this control unit is to convert the small change detected at the pick-up or probe and transmitted to it by means of the co-axial cable 10 into a relay action capable of controlling heavy currents. This relay action may be the closing of contacts that will energize a signal or open contacts in a pump or circuit or other loading device.

Among the devices which may be controlled by the relay unit is a bell, light or a horn 14. The control device might also be a valve, pump, vane, or loader, or a dumping device depending upon the material being controlled. With many types of pick-ups available, affording a variety of applications, this control might be used on the following materials: Dry powders, slurries, pulps, viscous materials, liquids, liquified gases, and the like. This control may also be used for batching, metering, weighing, moisture measurement, or detection, controlling the density of a material and the separation of several materials differing in density. In each of these applications, the value of the instrument is improved if the unit is of fail-safety construction and operation.

This makes it possible to provide an installation having an audible or visual signal if some trouble develops.

The coupling transformer or inductance is included in the control unit 12 as shown more clearly in Fig. 3 representing a perspective view and Fig. 4 representing a di-electric view of the spacing of the coils or inductances. It comprises a hollow insulator tube 15 attached to an insulator base 2 by a threaded connection 3. The base is attached to a suitable support by means of holes 4 and projecting from the base are terminals 1 to which extend conductors from a plurality of coils 17, 18, 19 and 20. These coils having the proper number of turns and physical dimensions are arranged on the tube 15 and are spaced by the following formulae and if so arranged, the effect will be as hereafter described, the computations being in centimeters of the distances between the coils:

Referring more particularly to Fig. 4, the distance $S_1$ is the distance between coils 17 and 18,
$S_2$ is the distance between coils 18 and 19, and
$S_3$ is the distance between coils 19 and 20.

These distances should be as follows:

$$S_1=\frac{3.5L(D_1-D_2)}{R}$$

$$S_2=.2 \text{ centimeter.}$$

$$S_3=\frac{L(D_1-D_2)}{R}$$

Where $L$=the inductance in micro-henries as determined by $$L=\frac{.2815\lambda^2}{C}$$

which is a standard formula where $\lambda$=Wavelength in meters.
$C$=Capacity in micromicrofarads to produce resonance.

and in the above spacing formulae $D_1$=Large diameter of coil
$D_2$=Small diameter of coil $$R=\frac{\text{Number of turns per centimeter}}{\text{Width of coil in centimeters}}$$

The above equation makes it possible to determine the size, shape and spacing of the parts of the inductance which is essential to the proper operation of the circuit by this means, the equation makes it possibles to calculate the number of turns and the spacing of the coils if it is desirable to change the operating frequency of the circuit. The coil could be made by a cut and try method, but this would have to be repeated for each change in the operating frequency and the coil would thus lack means of description or a definition as to shape, size and a number of turns of the wire compositing it. Specifically the spacing of the coils is the determining factor in the operation of the unit as it pertains to the invention. For a given number of turns, the spacing of the coils is critical, and the performance in accordance with the invention is determined therewith. In addition, the screw coupling 3 is provided for varying the inductance of the first coil 17.

Referring more particularly to Fig. 2, coil 20 is wound counter-clockwise as viewed from the left end of the coil and will produce a signal in phase with the input signal. It further acts as a wave trap or range determining inductance and by its spacing relative to coil 19 will control the locking-in effect to a relay 25 action which closes or opens its contacts 24 depending upon whether it is energized or not. Coil 19 is inductively coupled to coil 18 and is connected to an external terminal 36 through an isolating condenser or capacitor 37. This terminal 36 may be connected to the external probe 9 as illustrated in Fig. 1. Any change of capacitance at the probe 9 (between it and the ground) is induced into the coil 19 by means of said connection and has a predominant effect on coil 20 which is connected in the grid circuit of the electronic tube 29 by a capacitor 22 and a resistor 23 in parallel and with a capacitor 21 across the terminals of the coil 20.

Coil 17 is connected in the plate circuit of the electronic tube 29 and is wound in a clockwise direction as viewed from the left end and is inductively coupled to the coil 18 which is in the cathode circuit of the electronic tube 29 and being also wound in a clockwise direction is electrically 180° different in phase with respect to the signal as represented in coil 17.

In further describing the nature and operation of the invention as represented more particularly in Fig. 2, and to determine the equivalents of this circuit, it is pointed out that the term "range determining inductance" refers to the range of level control of the unit when used in conjunction with the proper external capacitor probe. By varying the micro-henry value of this inductance, the range of the level control can be varied.

Because there is an alternating current in coil 17 being supplied by the power transformer 28, there is likewise alternating current in coils 18, 19 and 20. The phase relationship as it appears in the leads coming out of these coils is most important and has been explained in the foregoing disclosure. It is the precise nature and value of these voltages and their phase relationship and potential, as determined by the number of turns and the coupling between the coils, that makes the small changes in external capacitance of the probe and causes the unit to operate. Coil 19 being inductively coupled to coil 20, will have the effect on coil 20 only when the external capacitor changes the phase angle of the current of coil 19. This can take place in any frequency range from 60 cycles up to several megacycles depending upon the number of turns used in the various coils and their construction.

No attempt is made herein to limit this device to the radio frequency range because it works equally well in the lower range when the proper phase relationship into the amplifier tube is maintained. As stated above, this unit will work over a range from several cycles up to several megacycles depending upon the number of turns in the various coils and their corresponding inductance.

The circuit as shown in Fig. 2 is a detector and as such is primarily an amplifier being controlled by the phase relationship of the voltage appearing on the grid as in relation to the cathode of the tube. There is no D.C. bias on the tube other than space charge voltage that would be present in a small valve. The tube conducts on the positive half cycle; actually the tube conducts when the phase relationship of the voltage between the grid and the cathode of the tube is such as to create a positive voltage basis.

The four coils are needed so that the external probe circuit can be grounded at one end of the coil 19 to prevent voltage from the power transformer appearing at the probe 36 in case the tube or other elements become faulty. The spacing between coils 17 and 18 is equal to the spacing between 20 and 18. Perhaps a better term is equal spacing rather than lineal spacing.

A three to one ratio was found by experimentation to give good electrical coupling without being so critical that phase inversion of the voltage could take place.

The external capacitor controls the tuning of the coil 19 and when the valve of the capacitor is such as to approximately produce resonance in this coil, the voltage phase changes to cause the tube to conduct and the relay to operate. The capacitor and coils form resonance, or usually just changes the phase to cause conduction by the tube rather than to cause resonance for the purpose of oscillation.

One of the important features of this invention is a circuit and inductance design that allows two levels of material to be controlled by a single unit. This is made possible by the coil design. Normally the magnetic relay would operate by an external capacity of a certain value. By having the magnetic relay being made to close on an external capacity of one predetermined value and to open at another predetermined value is to allow control at two different levels. This is accomplished by the coil in the circuit as described. An equivalent circuit of Fig. 2 would be the use of a triode tube, using the filament as a cathode with corresponding modifications in the circuit.

It is pointed out that no direct claims have been made to the electron tube and its components necessary to complete the electronic circuit other than the design of the inductance used in conjunction with the electron tube circuit. The invention is not in the use of multiple coils but specifically in the use of the four coils for proper electrical voltage phase distribution to the electron tube, and the isolation of the probe control element from the power voltage of the circuit to prevent harmful voltage from appearing at the probe in the event of an electrical failure occurring in the tube.

A special co-axial cable transmits the change in capacitance of the pick-up to the control unit. A single wire or a plurality of wires 41, 42 and 43 are supported by means of an insulator strip which is twisted to form a helicoid which has good side support strength, but may be bent around a radius as small as 6″. Such a small volume of insulating material is needed to support the wires that most of the di-electric surrounding the wire or wires is a gas so that the electrical capacitance per foot is a minimum for a given size of conductor.

Figure 7:
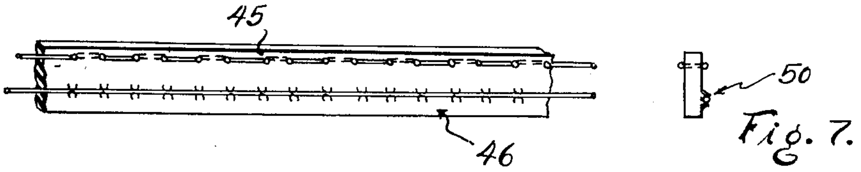
Figure 8:
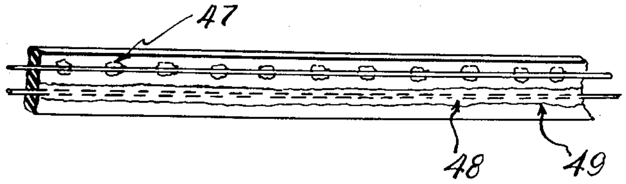

The wire or wires may be fastened to the strip in a variety of ways by imbedding the wires in the strip 44 as shown in Fig. 1; by providing perforations 45 in a strip 46 and lacing the wire through them as shown in Fig. 7; by cementing a wire 48 directly to a strip 49 as shown in Fig. 8; by perforating the strip 46 and anchoring the wire on small projections 50.

To further reduce the di-electric of the material supporting the conductor, the insulator strip may be perforated to eliminate some of the material without weakening its supporting quality. This reduction in the amount of insulator material to support the wire results in a smaller capacity per foot of cable length.

If several wires are attached to the strip in a continuous parallel arrangement, by means of series or parallel electrical combinations, they may be used for regulating the impedance of the cable so that a cable would have constant impedance regardless of length. This feature has considerable value as it allows a cable to be furnished with an impedance approximately the same for each cable furnished whether the cable is 5′ or 10′ long. Thus it could have the same electrical value and would not change the operation of a unit. It is of considerable importance to be able to furnish standard value cables so that regardless of length, the value would be consistent, say 100 units.

Figure 6:
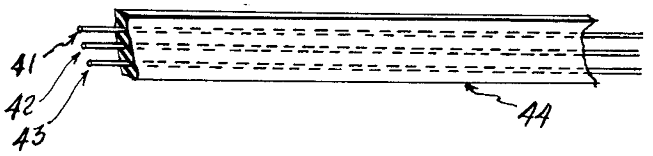
Figs. 6, 7 and 8 show various methods of supporting conductors in an insulating strip which is thereafter helically twisted in a continuous length.
Figure 9:
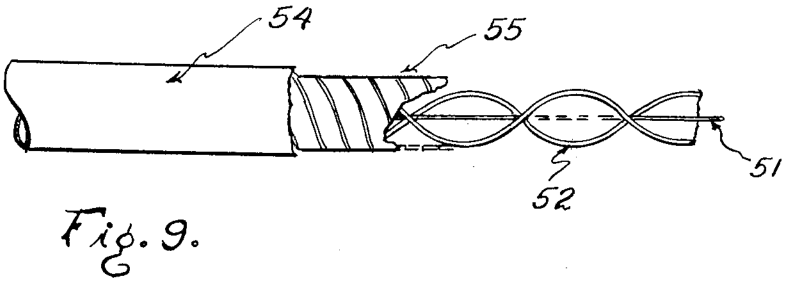
Fig. 9 shows a helically twisted strip installed in a flexible metal shield with an outer protecting shield.

When a wire or conductor 51 as shown in Fig. 9 is attached to an insulator strip 52, or any of the other arrangements shown in Figs. 6, 7 and 8 and the insulating strip is twisted helically and pulled into a twisted metal cover 55 such as copper or ferrous metal in the form of a flexible metal hose which is readily available commercially, it is further covered with a protecting plastic insulator strip 54 or other suitable material.

In illustrating the purpose and action of the invention, a small capacitance change at the probe 9 which is represented by the external terminal 36 in Fig. 2 is transmitted to the relay circuit by means of the co-axial cable (10 in Fig. 1) and by means of the coupling capacitor 37, a coupling inductance 19 is amplified and converted into a useful control circuit. This is accomplished by the operation of the plate current relay 25 which actuates the contacts 24 producing a control circuit at terminals 31 and 32 which may actuate an alarm, or a signal device, or may start or stop pumps and other equipment.

A small capacitance change at the probe 9 may be produced by the proximity of the material such as a liquid, a granular substance, or a liquid gas which produces a change in the dielectric media of the probe active element with relation to the ground. This is particularly useful in the controlling of liquid or viscous material where it is not desirable to touch a material to produce relay actuation.

The primary requirement of industrial control is fail-safe operation. In the event of any component failure, the electronic connections will produce the necessary circuit such as to sound an alarm or to turn off other control equipment. This invention particularly accomplishes this by providing a normally energized relay circuit so that if a component should fail, the relay will become de-energized and will produce the proper control condition at terminals 31 and 32. This de-energizing also will take place if the coaxial cable 10 is disconnected from the probe (or terminal 36) causing a predetermined decrease in capacity. This fail-safe condition will also occur if the coaxial cable should become short-circuited to the ground causing more than a predetermined or expected change in capacity at the terminal 36. Thus it may be said that the relay will sense a decrease in capacity or an increase in capacity over expected or predetermined values. This results in an improvement in safe operations if an external failure occurs either in the probe 9 or in the coaxial cable 10 or should power fail to the control unit 12.

Figure 5:
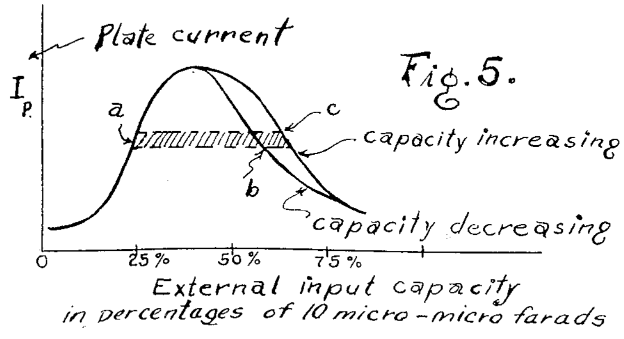
Fig. 5 is a graph showing the relations of the plate current to external capacity of the probe.

In further explaining the operation, reference is made to the graph shown in Fig. 5 which represents the plate current of the electronic tube 29 as drawn in relation to the extreme capacity of the probe as it affects or acts upon the coupling coil 19.

One novel feature of this invention is illustrated by the curve which shows that the relay, as 25, will be operated by a decrease in capacity below a predetermined point A and the relay will also be operated should the capacity increase above a predetermined point C, and within the limits of this curve, it can establish a holding zone between the points A and C, a third operating value at the point B. This is especially useful in the controlling of the filling of vessels with liquid to establish a holding zone to stop a pump at a predetermined high level and not start the pump until a predetermined low level is reached. This is explained in terms of Fig. 5 by representing the high level as an increase in capacity having a relay trip point C where the contacts open. The contacts will not close until a smaller external capacity (at probe B) is secured by the level of the liquid falling and establishing a new value represented by B.

While a preferred embodiment of this invention has been described in some detail, it should be regarded by way of illustration and example rather than a restriction or limitation thereof, as many changes in the construction, combination and arrangement of the parts may be made without departing from the spirit and scope of the invention.

I claim:

In a capacitance inductive electronic control system, the combination with an electronic tube having an exciter, a cathode, grid, and plate; means to supply current to the tube exciter and to the control system; a relay having a winding and contact means to open and close a control circuit extending from this system; four inductively related coils spaced apart on a common insulating support, a first coil connected to said current supply at one end and through the relay winding to the tube plate; a second feed back coil connected to the cathode at one end and to the system ground at the other end; a third coupling inductor coil closely related to the second coil and connected at one end to the ground and having an electrical conductor probe at its other end with a coupling capacitance spaced from this end;

and a fourth coil inductively having one end connected to the tube grid and the other end to the ground; whereby a small capacitance change at the probe is transmitted through the tube plate to a circuit including the control relay winding to open and close its contact means for said extending control circuit.

References Cited in the file of this patent

UNITED STATES PATENTS

| | | |
|---|---|---|
| 2,132,875 | Myers | Oct. 11, 1938 |
| 2,419,266 | Kliever et al. | Apr. 22, 1947 |
| 2,505,577 | Rich | Apr. 25, 1950 |
| 2,529,846 | McBrayer | Nov. 14, 1950 |
| 2,615,960 | Erwin | Oct. 28, 1952 |
| 2,668,911 | Schlesinger | Feb. 9, 1954 |
| 2,744,238 | Andresen | May 1, 1956 |